US012535839B2

(12) United States Patent
Troy et al.

(10) Patent No.: US 12,535,839 B2
(45) Date of Patent: Jan. 27, 2026

(54) COMPONENT COMMUNICATIONS IN SYSTEM-IN-PACKAGE SYSTEMS

(71) Applicant: Octavo Systems LLC, Sugar Land, TX (US)

(72) Inventors: Kevin Michael Troy, College Station, TX (US); Peter Robert Linder, Sugar Land, TX (US)

(73) Assignee: Octavo Systems LLC, Sugar Land, TX (US)

( * ) Notice: Subject to any disclaimer, the term of this patent is extended or adjusted under 35 U.S.C. 154(b) by 681 days.

(21) Appl. No.: 17/819,902

(22) Filed: Aug. 15, 2022

(65) Prior Publication Data

US 2022/0390970 A1    Dec. 8, 2022

Related U.S. Application Data

(63) Continuation-in-part of application No. 15/589,823, filed on May 8, 2017, now Pat. No. 11,416,050.

(51) Int. Cl.
| | |
|---|---|
| *G05F 1/46* | (2006.01) |
| *G01F 1/28* | (2006.01) |
| *G01R 31/28* | (2006.01) |
| *G06F 1/26* | (2006.01) |
| *G06F 15/78* | (2006.01) |

(52) U.S. Cl.
CPC .................. *G05F 1/46* (2013.01); *G01F 1/28* (2013.01); *G01R 31/2896* (2013.01); *G06F 1/26* (2013.01); *G06F 1/263* (2013.01); *G06F 15/7807* (2013.01); *G01N 2201/12* (2013.01)

(58) Field of Classification Search
CPC ........ G01R 31/2879; G01R 31/318513; G06F 1/28; G06F 1/22; G06F 1/26; G06F 1/263; G06F 1/3215; G06F 1/3296; G01N 2201/12; G05F 1/46
See application file for complete search history.

(56) References Cited

U.S. PATENT DOCUMENTS

| | | |
|---|---|---|
| 4,667,403 A | 5/1987 | Edinger |
| 5,396,403 A | 3/1995 | Patel |
| 5,683,788 A | 11/1997 | Dugan |

(Continued)

FOREIGN PATENT DOCUMENTS

| | | | |
|---|---|---|---|
| EP | 1926138 A1 | 5/2008 | |
| EP | 3370152 B1 * | 12/2019 | ......... G11C 29/1201 |

(Continued)

OTHER PUBLICATIONS

International Search Report and Written Opinion issued in Application No. PCT/US2015/045022, dated Nov. 4, 2015, 14 pages.

(Continued)

*Primary Examiner* — Shelby A Turner
*Assistant Examiner* — Yaritza H Perez Bermudez
(74) *Attorney, Agent, or Firm* — Rothwell, Figg, Ernst & Manbeck, P.C.

(57) ABSTRACT

A power management device and microprocessor within a System-in-Package (SiP) are provided with communication signals externally available as outputs from the SiP so that they can be reconfigured by an external device. Methods for the configuration of SiPs and Power Management Integrated Circuits (PMICs) packaged within a SiP are also provided.

6 Claims, 13 Drawing Sheets

(56) References Cited

U.S. PATENT DOCUMENTS

| | | |
|---|---|---|
| 5,696,029 A | 12/1997 | Alvarez et al. |
| 5,710,693 A | 1/1998 | Tsukada et al. |
| 6,133,626 A | 10/2000 | Hawke |
| 6,268,238 B1 | 7/2001 | Davidson |
| 7,060,535 B1 | 6/2006 | Sirinorakul et al. |
| 8,065,576 B2 | 11/2011 | Miner et al. |
| 9,490,188 B2 | 11/2016 | Arvelo et al. |
| 9,733,661 B2 * | 8/2017 | Hsu ................ G01R 19/0084 |
| 9,984,762 B1 | 5/2018 | Seshasayee et al. |
| 10,019,021 B1 * | 7/2018 | Lee ................ H02M 3/158 |
| 10,204,890 B2 | 2/2019 | Murtuza et al. |
| 10,470,294 B2 * | 11/2019 | Welsh ................ H05K 1/0231 |
| 10,714,430 B2 | 7/2020 | Murtuza et al. |
| 10,922,251 B2 | 2/2021 | Lee et al. |
| 2002/0017708 A1 | 2/2002 | Takagi et al. |
| 2002/0052054 A1 | 5/2002 | Akram |
| 2002/0170901 A1 | 11/2002 | Lau |
| 2003/0010477 A1 | 1/2003 | Khrustalev et al. |
| 2003/0110427 A1 | 6/2003 | Rajsuman et al. |
| 2004/0229400 A1 | 11/2004 | Chua |
| 2005/0225177 A1 * | 10/2005 | Jacobs .................... G06F 1/26 307/82 |
| 2007/0013402 A1 | 1/2007 | Ong et al. |
| 2008/0029668 A1 | 2/2008 | Lee |
| 2008/0288908 A1 | 11/2008 | Hart et al. |
| 2008/0290486 A1 | 11/2008 | Chen et al. |
| 2009/0278245 A1 | 11/2009 | Bonifield et al. |
| 2010/0052135 A1 | 3/2010 | Shim et al. |
| 2010/0109612 A1 * | 5/2010 | Nguyen ................ G01R 31/40 320/136 |
| 2010/0134133 A1 | 6/2010 | Pagani |
| 2010/0199254 A1 * | 8/2010 | Huynh ................ G06F 1/3203 716/128 |
| 2011/0022826 A1 * | 1/2011 | More .................... G06F 9/4401 713/1 |
| 2011/0233753 A1 | 9/2011 | Camacho et al. |
| 2012/0241984 A9 | 9/2012 | Pendse |
| 2013/0214386 A1 | 8/2013 | Xie |
| 2014/0035102 A1 | 2/2014 | Korec et al. |
| 2014/0035548 A1 | 2/2014 | Oaklander |
| 2014/0097818 A1 | 4/2014 | Wiktor et al. |
| 2014/0284701 A1 | 9/2014 | Korec |
| 2014/0346512 A1 * | 11/2014 | Nomura ............. G01R 31/3185 257/48 |
| 2014/0346876 A1 * | 11/2014 | Luo ........................ G06F 1/266 307/43 |
| 2015/0028940 A1 * | 1/2015 | Tsao .................... H01L 23/5286 327/565 |
| 2015/0130040 A1 | 5/2015 | Defretin |
| 2016/0165304 A1 * | 6/2016 | Klarke ................ G09G 5/006 725/139 |
| 2017/0023999 A1 | 1/2017 | Reynov et al. |
| 2017/0115717 A1 | 4/2017 | Shankar et al. |
| 2017/0336816 A1 | 11/2017 | Okajima et al. |
| 2018/0081412 A1 * | 3/2018 | Sato ........................ G06F 1/28 |
| 2018/0225249 A1 * | 8/2018 | Lambourne ......... G06F 13/4022 |
| 2018/0247905 A1 | 8/2018 | Yu et al. |
| 2018/0254079 A1 * | 9/2018 | Cox ...................... G11C 29/52 |
| 2018/0317323 A1 * | 11/2018 | Welsh ................ H05K 3/0005 |
| 2018/0321313 A1 * | 11/2018 | Troy ........................ G06F 1/26 |
| 2019/0074268 A1 * | 3/2019 | Murtuza ................ H01L 21/50 |
| 2019/0355678 A1 | 11/2019 | Lin et al. |
| 2020/0019312 A1 * | 1/2020 | Kinsley .................... G11C 5/14 |
| 2020/0201762 A1 * | 6/2020 | Bang .................... G06F 12/0804 |
| 2022/0199142 A1 * | 6/2022 | Mathiyalagan ...... G11C 29/022 |
| 2024/0136833 A1 * | 4/2024 | Cho .................... H02J 7/00714 |
| 2024/0203980 A1 * | 6/2024 | Cho .................... H10D 89/611 |

FOREIGN PATENT DOCUMENTS

| | | | | |
|---|---|---|---|---|
| WO | 9852226 A1 | 11/1998 | | |
| WO | WO-2005101168 A1 * | 10/2005 | ............. | H02J 1/082 |
| WO | WO-2011010150 A2 * | 1/2011 | ............. | G06F 9/445 |
| WO | WO-2014169292 A2 * | 10/2014 | ............. | H02S 40/30 |
| WO | 2016025693 A1 | 2/2016 | | |

OTHER PUBLICATIONS

International Search Report and Written Opinion issued in Application No. PCT/US16/50157, dated Jan. 17, 2017, 24 pages.
International Search Report and Written Opinion issued in Application No. PCT/US17/015728, dated Jun. 6, 2017, 16 pages.
International Search Report and Written Opinion issued in Application No. PCT/US17/49611, dated Dec. 27, 2017, 17 pages.
International Search Report and Written Opinion issued in Application No. PCT/US17/052014, dated Dec. 4, 2017, 15 pages.
International Search Report and Written Opinion issued in Application No. PCT/US18/16171, dated Apr. 25, 2018, 12 pages.
C.R. Schlottmann, "Analog Signal Processing on a Reconfigurable Platform", Master's Thesis, School of Electrical and Computer Engineering, Georgia Institute of Technology, Aug. 2009, 72 pages.
J. McEleney, et al., "Multisite Test Strategy For SIP Mobile Technologies", Jul. 2006, 6 pages.
R. Normann, "First High-Temperature Electronics Products Survey 2005", Sandia Report, Apr. 2006, 44 pages.
S. Bernard, et al., "Testing System-In Package Wirelessly", IEEE, DTIS'06: Design and Test of Integrated Systems in Nanoscale Technology, Sep. 2006, Tunis (Tunisia), pp. 222-226, http://hal-lirmm.cosd.cnrs.fr/lirmm-00094916, Sep. 15, 2006.
D. Appello, et al., "System-in-Package Testing: Problems and Solutions", IEEE, May-Jun. 2006, 4 pages.
Z. Noun, et al., "Wireless Approach for SIP and SOC Testing", Micro and nanotechnologies/Microelectronics, Université Montpellier II—Sciences et Techniques du Languedoc, 2010, English, https://tel.archives-ouvertes.fr/tel-00512832, Aug. 31, 2010, 66 pages.
P. O'Neill, "Choosing the Right Strategy for SIP Testing", EE Times, Connecting the Global Electronics Community, May 10, 2004, 2 pages.
M., Quirk, et al., "Semiconductor Manufacturing Technology", IC Fabrication Process Overview, Chapter 9, Oct. 2001, 41 pages.
J. Watson, et al., "High-Temperature Electronics Pose Design and Reliability Challenges", Analog Dialogue 46-04, Apr. 2012, 7 pages.
S. Benjaafar, et al., "Batch Sizing Models for Flexible Manufacturing Cells", Submitted to International Journal of Production Research, Department of Mechanical Engineering, University of Minnesota, 1995, 43 pages.
C. T. Sorenson, "Semiconductor Manufacturing Technology: Semiconductor Manufacturing Processes", NSF/SRC Engineering Research Center for Environmentally Benign Semiconductor Manufacturing, Arizona Board of Regents for The University of Arizona, 1999, 34 pages.
"Downhole Solutions", Motion Control Solutions Tailored to Your Critical Downhole Applications, What Moves Your World, MOOG, May 2013, 8 pages.
A. Weintraub, "Is Mass Customization the Future of Retail?", https://www.entrepreneur.com/article/229869, Nov. 14, 2013, 5 pages.
Hashimoto et al., "A System-in-Package (SIP) With Mounted Input Capacitors for Reduced Parasitic Inductances in a Voltage Regulator," 2010, IEEE, 25(3), pp. 731-740.
Office Action issued for U.S. Appl. No. 15/503,932 on Jan. 5, 2018, 20 pages.
Final Office Action issued for U.S. Appl. No. 15/503,932 on Aug. 2, 2018, 9 pages.
Office Action issued for U.S. Appl. No. 15/968,184 on Nov. 15, 2018, 25 pages.

\* cited by examiner

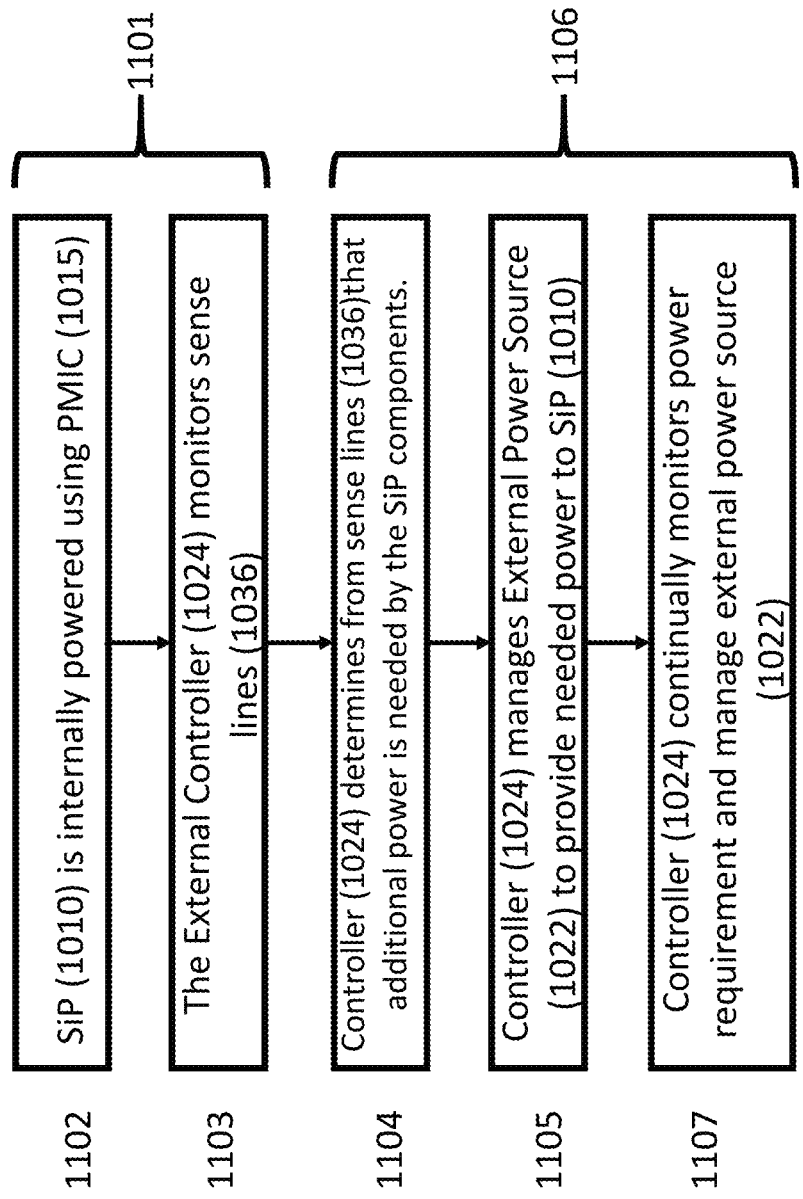

COMPONENT COMMUNICATIONS IN SYSTEM-IN-PACKAGE SYSTEMS

CROSS REFERENCE TO RELATED APPLICATION

This application is a continuation-in-part of U.S. patent application Ser. No. 15/589,823, filed May 8, 2017, which issued as U.S. Pat. No. 11,416,050 on Aug. 16, 2022, the disclosures of which are incorporated herein by reference in their entirety.

TECHNICAL FIELD

Aspects of the present disclosure relate to communications with and/or between components of a packaged system.

BACKGROUND

System-In-Package ("SiP") systems may contain multiple devices, including both active and passive devices. These systems can include, for example, microprocessors (uPs), microcomputers/microcontrollers (uCs), memories, analog interfaces, sensors, power drivers and passive devices. These individual devices typically need to receive power, and thus, the systems may use power management devices. Traditionally, management devices have been designed assuming they are independent devices populated on a PCB, and therefore, can easily be debugged, for instance, by disconnecting the various signal lines that are used for the communications and manipulating them as needed for modification or testing. However, once component devices are integrated into a packaged system, these signals may no longer available to the outside, as all connections are now inside the package. Because the signals from these devices are not available outside of the system, the devices cannot be debugged, and the various devices cannot be independently managed, modified, and/or tested. For example, it may not be possible for a power management device to be reprogrammed to adjust its output voltages once it is installed in a packaged system.

Accordingly, there remains a need for effective ways to manage power and connections for individual components and/or a system after the system has been packaged.

SUMMARY

According to some embodiments, a SiP device is described in which selected signals for components and devices in the SiP are connected inside the SiP for normal SiP operations, and are also provided externally from the SiP for one or more of programming, testing, powering, and debugging.

According to some embodiments, a SiP device is provided that has a substrate, a power management device, a uP/uC, and one or more additional components, where the components and uP/uC are arranged such that the SiP will perform one or more preselected functions. The SiP device may also include a plurality of external connectors and a package that encapsulates the power management device, uP/uC, and the additional components, but leaves the external connectors exposed. The external connectors may be, for instance, pin connectors or a ball grid array. According to certain aspects, a first plurality of the external connectors are for providing and/or receiving signals corresponding to the one more preselected functions during normal operation of the SiP device, while a second plurality of the external connectors are for providing and/or receiving communications signaling for one or more of the power management device and uP/uC. Additionally, a third plurality of the external connectors may be for providing and/or receiving at least one of an input voltage and an output voltage of the power management device. In certain aspects, the external connectors are arranged such that power management device can be reconfigured by an external device, such as a test controller.

To power all the devices of a system, a class of components referred to as Power Management Integrated Circuits (PMICs), along with other power management devices such as Low Drop Out power supplies (LDOs), may be implemented. In certain aspects, a PMIC device may be designed to work with specific uPs or uCs to properly power up devices, protect against over voltage or over current, and/or do specific handshakes with a uP or uC to make sure the system is operating correctly.

According to some embodiments, a PMIC is provided that includes at least one programmable power generating subsystem and a control logic subsystem. The power generating subsystem may be configured, for instance, to output a plurality of signals, where a first of the plurality of signals has a first value for powering one or more components of a device, and a second of the plurality of signals has a second value. In some embodiments, the first value is an operational value and the second value is a monitoring value indicative of the first value. The control logic subsystem can be used for setting the first value. For example, the control logic subsystem can be configured to modify the first value based on the second value. In some embodiments, the first and second value are the same. The control logic subsystem can be externally controllable via one or more inputs of the PMIC. In further embodiments, a PMIC may be provided with a plurality of externally controllable switches. In some instances, the switches may be arranged to selectively prevent output of the first signals, such as operational power signals, and enable output of the second of signals, which can be sense/monitoring signals.

According to some embodiments, one or more signals, including power and/or control signaling, from both a PMIC and the uC/uP devices in a packaged system, such as a SiP, are output to external pins or ball grid connectors exposed from the packaging of the system. In some embodiments, the SiP may use a wireless communications subsystem in addition to, or in place of, the exposed external connectors for communicating the internal signals to outside sources. According to certain aspects, a SiP with such features can not only allow a system designer to debug the power management portion of the SiP, but also allow the system to monitor and manage how the PMIC and uC/uP behave and interact in the SiP. In some instances, a system designer may make additional connections external to the SiP to enable testing and/or external power delivery to and from the SiP.

In some embodiments, a PMIC within a SiP is provided with communication signals externally available as outputs from the SiP so that they are also available as inputs back into other components of the SiP, and for controlling whether the power generating sections of the PMIC are available for providing power to the components, or only available for controlling and establishing the desired voltages for each of the power generating subsystems of the PMIC. As one example, a number of signaling interconnects for a PMIC in a SiP may be left disconnected on the substrate and require external connections. With these external connections left to be connected, the PMIC voltages may be programmed after the PMIC is put into the SiP without damaging the other components. In some embodiments, external power sources may be combined with power outputs from the PMIC to meet the power needs of components in the SiP.

According to some embodiments, a method for powering a System-in-Package (SiP) device having a plurality of internal components and an internal power management device mounted therein is provided. The method comprises the steps of delivering power to at least one of the internal components only from the power management device, and delivering power to the at least one internal component simultaneously from both the power management device and an external power source. In some embodiments, the method further comprises delivering power to the at least one internal component only from the external power source.

According to some embodiments, a system is provided. The system comprises a System-in-Package (SiP) device having an internal power management device, one or more internal components, and a plurality of external connectors; and least one external power supply for powering the system. In certain aspects, the internal power management device of the SiP is configurable using a first set of the external connectors, the at least one external power supply provides power to the internal power management device of the SiP using a second set of the external connectors, and the at least external power supply provides power to one or more of internal components of the SiP using a third set of external connectors.

These and other features of the present disclosure will become apparent to those skilled in the art from the following detailed description of the disclosure, taken together with the accompanying drawings.

BRIEF DESCRIPTION OF THE DRAWINGS

FIG. 11 is a flow chart of a process according to some embodiments.

DETAILED DESCRIPTION

Figure 1:
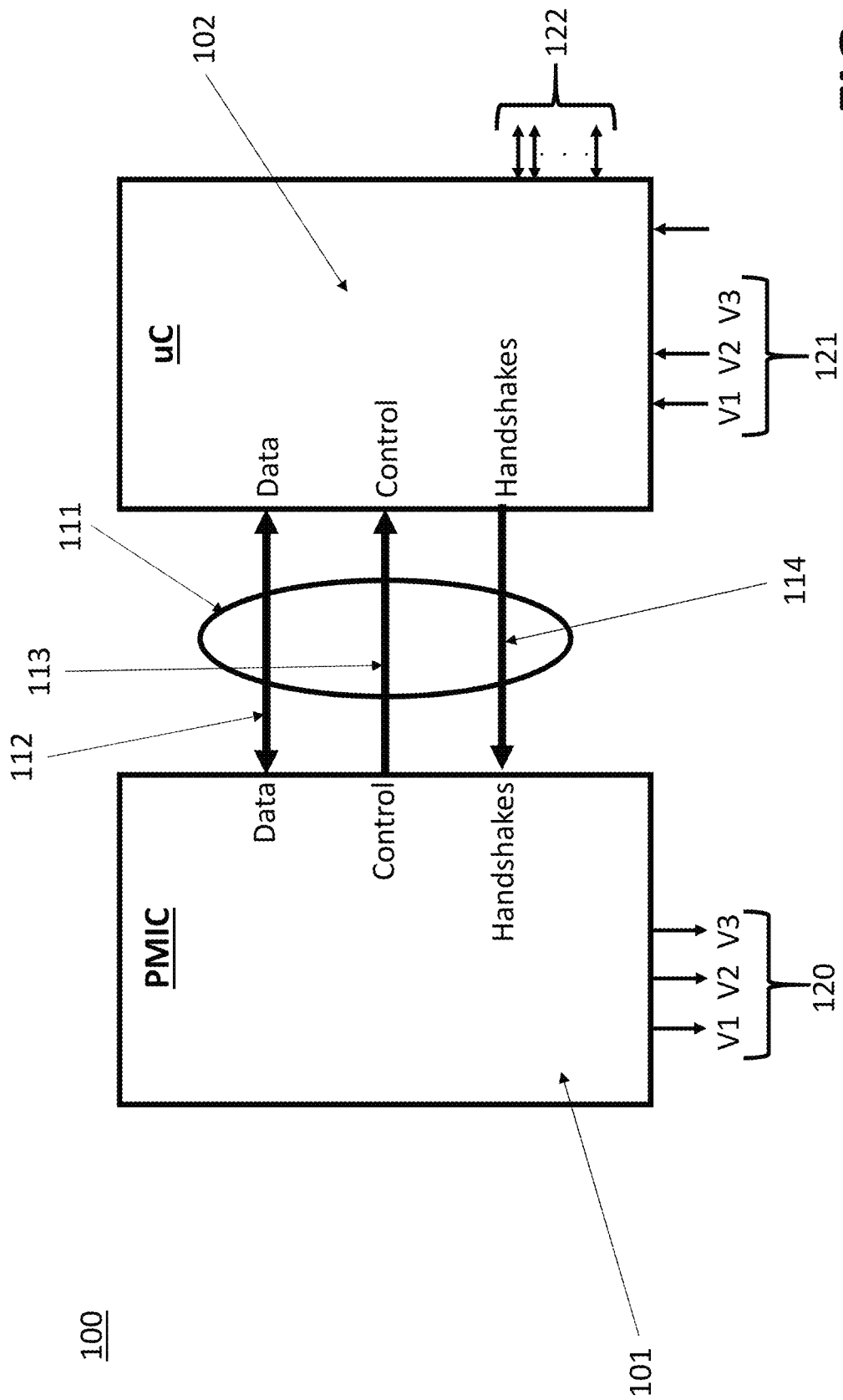
FIG. 1 depicts signaling between a Power Management Integrated Circuit (PMIC) and a microcontroller (uC).

FIG. 1 is a block diagram of a system design 100 having a PMIC 101 and a microcomputer/microcontroller (uC) 102, with communications signals 111. In this figure, the communications signals are illustrated as data, control, and handshake signals, but communications signals between power management devices and other components are not necessarily limited by these examples. Additionally, although a uC is depicted in FIG. 1, the component 102 may optionally, for other system designs and embodiments, be a microprocessor (uP). In the example of FIG. 1, the communications signals 111 are individually labelled 112, 113, and 114. In a traditional system design using a Printed Circuit Board (PCB) and packaged devices, these signals would have been readily accessible on the PCB, such that these communications signals could have been used to troubleshoot the circuits or to manage or modify the power distribution on the PCB by alternative means. But when used in a SiP, for instance, as described in certain embodiments, the signal lines may be routed and connected via communications paths in the substrate used for the SiP, and accordingly encapsulated along with the PMIC, uP, and any other components mounted on the substrate. Thus, when SiP-mounted, signals 111 would not have been available outside of the SiP.

In the example of FIG. 1, there are illustrated output voltages V1, V2, and V3 (collectively 120) that can be used to power additional components located in the SiP. In a similar manner, the supply of those three voltages (collectively 121) to the uC are depicted, and the interconnection of the uC to the other components of the SiP via various input and output signals 122 are provided.

Figure 2:
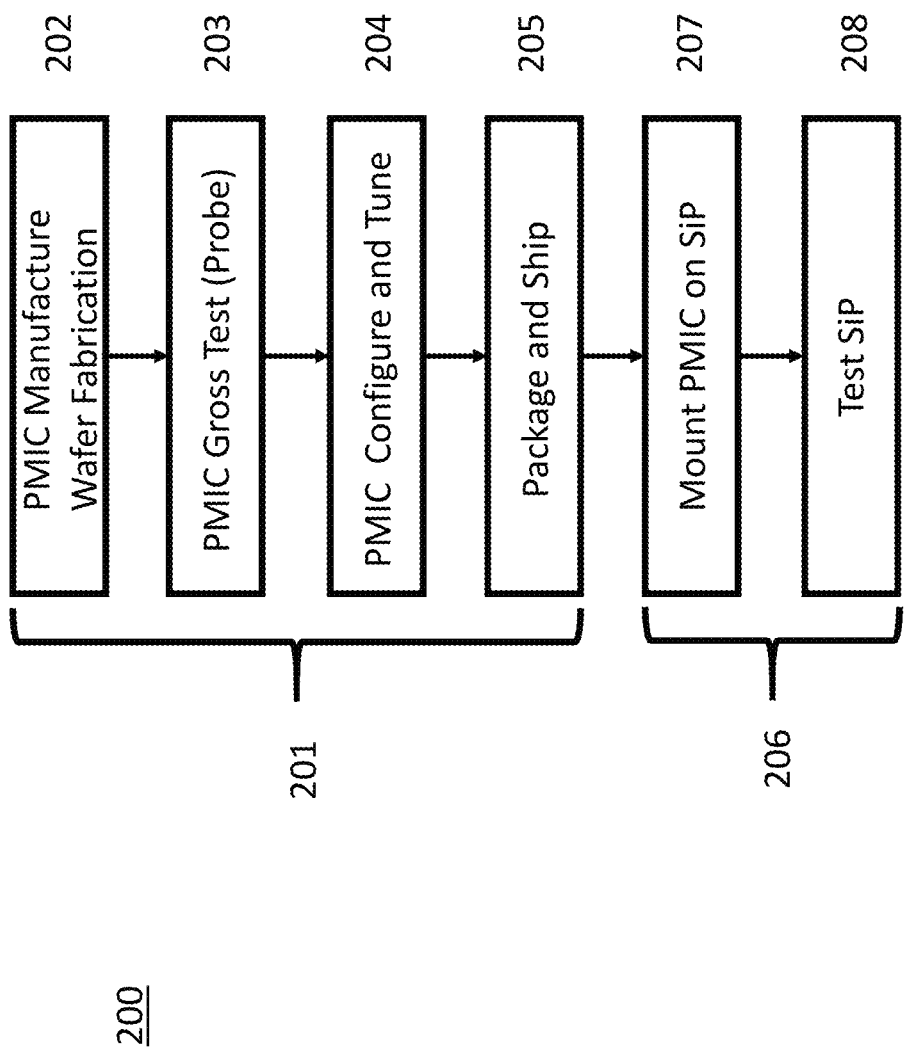
FIG. 2 depicts a process for PMIC manufacture, testing, and mounting in a SiP.

FIG. 2 depicts a manufacturing flow 200 for a PMIC from a PMIC manufacturer 201, which could include semiconductor, wafer-level processing, to an assembler 206 of a system using the PMIC. In this example, the process begins with the manufacture of the PMIC 202, for example, in accordance with normal semiconductor fabrication methods, followed by initial testing or wafer probing 203, followed by configuring and tuning 204 of the PMIC. This may be, for instance, to set the actual desired voltages needed from the PMIC. Flow 200 may then include packaging and shipping 205 of the PMIC to an assembler or customer. Then, the packaged PMIC is mounted on a SiP 207 by a SiP assembler 206. Once the SiP components are all mounted and the SiP is encapsulated in a package, the functionality of the SiP may be tested 208.

Figure 3:
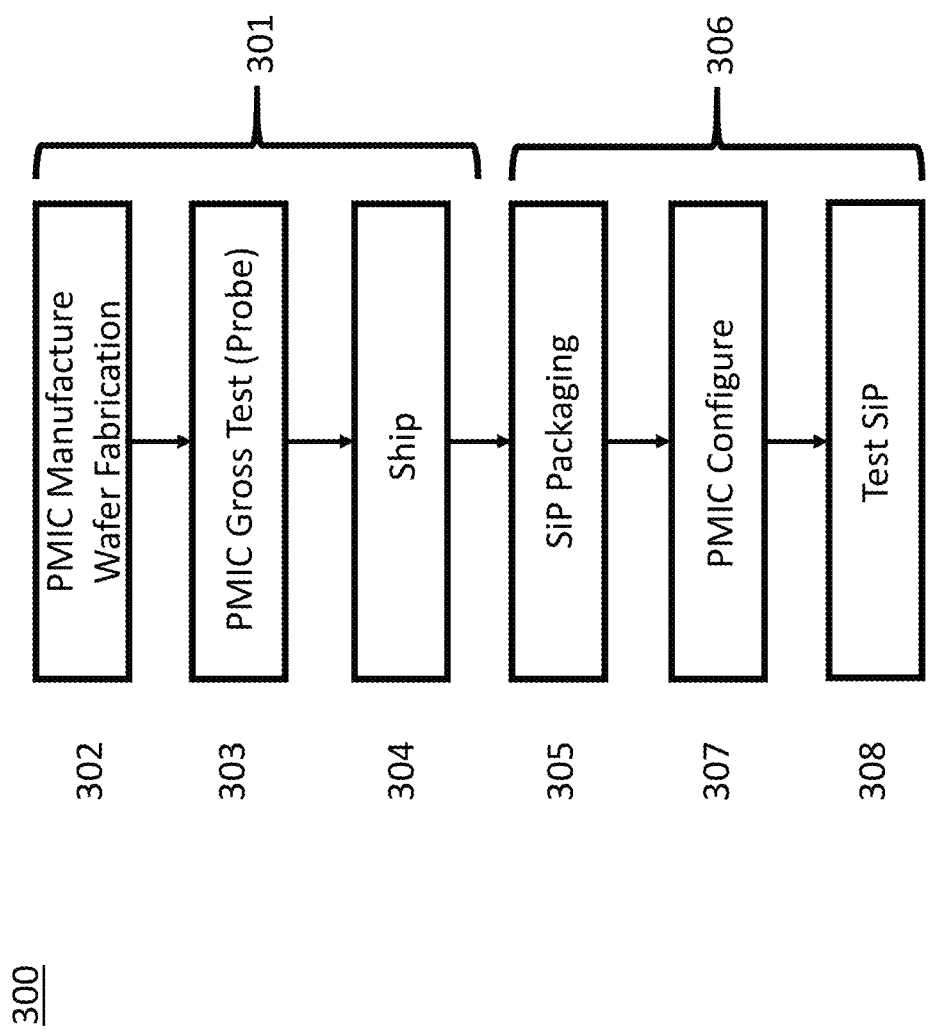
FIG. 3 depicts a process for PMIC manufacture, testing, and mounting in a SiP according to some embodiments.

FIG. 3 depicts a SiP process flow 300 according to some embodiments. Process 300 may have two primary aspects, including manufacture 301 and assembly 306. The process may begin with step 302 with the manufacture of a power management device, such as a PMIC. This may include, for instance, semiconductor, wafer-level processing. This may be followed by step 303, which can include testing, such as wafer probing. In step 304, the device, may be shipped from the manufacturer. For instance, it may be shipped to assembler 306. According to some embodiments, the device, such as a PMIC, is shipped as an unpackaged or "bare" die.

According to some embodiments, in step 305 the power management device is received by the assembler 306 and packaged into a SiP device. Packaging the SiP can include, for instance, mounting the power management device along with any additional components of the SiP onto a SiP substrate, and then encapsulating all the components in a packaging material. This material may include, for instance various mold compounds (sometimes called plastics), ceramic or other materials to protect the components from mechanical, electrical, or environmental issues. According to some embodiments, the packaging of the SiP may leave a plurality of external connectors exposed from the package, which can be used to access some of the internal components, such as, for example, but not limited to a PMIC and uC/uP of the SiP. In some embodiments, the additional components include both active and passive components. Also, the substrate may comprise operative interconnections between said power management device and the other internal components.

According to certain further aspects, in step 307, the internal power management device, illustrated as a PMIC, can be configured, and tuned. In certain aspects, this occurs after the assembly on the SiP substrate by an external device. According to some embodiments, configuring and tuning step 307 may be the same or similar as the step 204 of FIG. 2. However depending on the specific process flow, such a configuring and tuning step may also be performed by the manufacturer 301 or the by the assembler 306, or by both. In some embodiments, and if both configure and tuning steps remain, then they may be split such that an additional step by the manufacturer following the probe test step 303 does only the configuring, and then the step 304 by the assembler 306 would only do tuning. For instance, a configuring step could set up the appropriate voltages for the PMIC's outputs, and the tuning step would fine tune the exact voltages and any delay or timing for each power (or voltage) becoming available as an output in the SiP. In step 308, the final packaged SiP is then tested 308. After passing final testing it may then be shipped to a customer.

Figure 4:
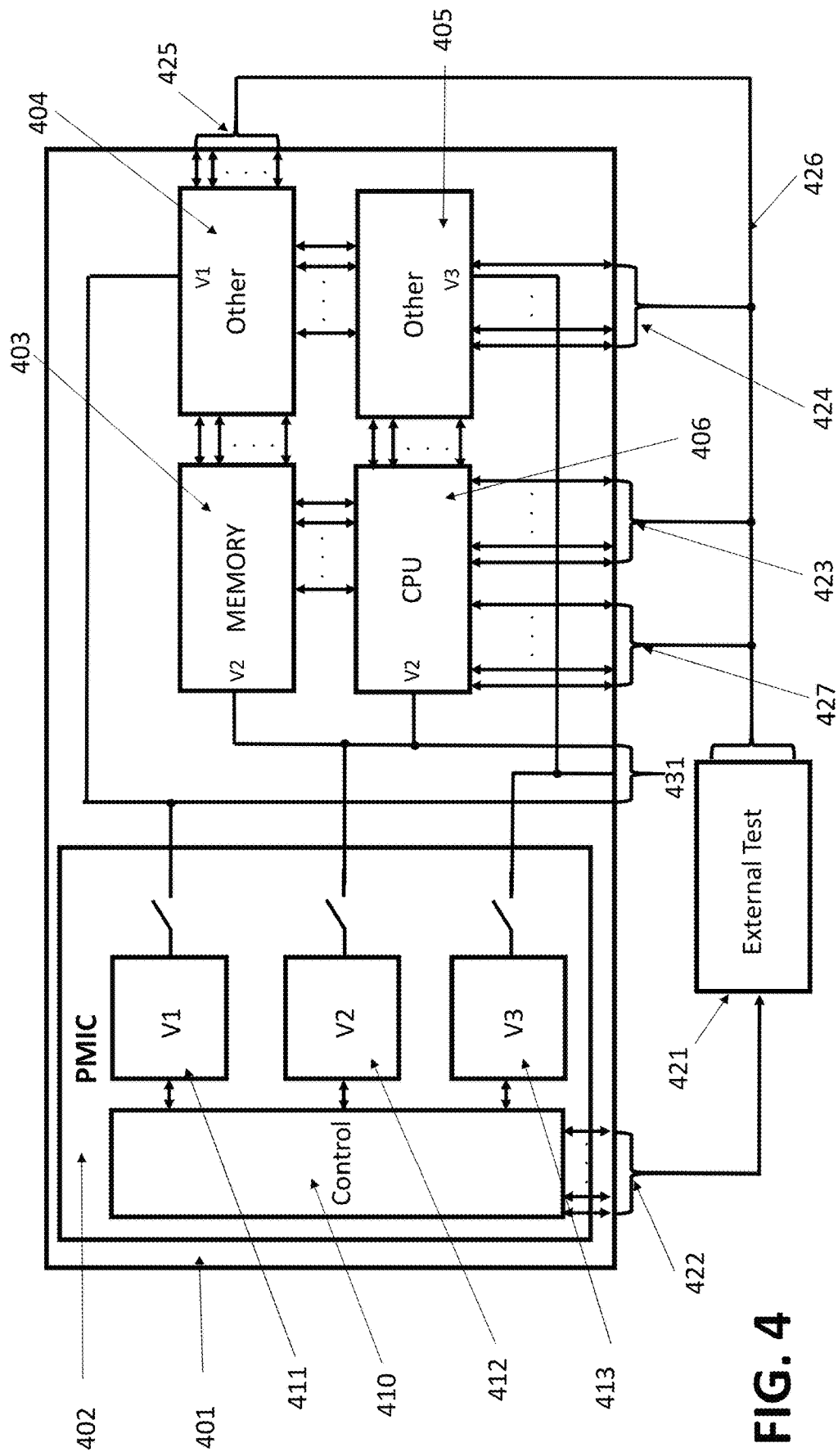
FIG. 4 is a block diagram of a SiP design according to some embodiments.

FIG. 4 depicts a block diagram of an embodiment for a packaged SiP 401. The SiP may be configured for performing preselected functions, such as smart sensors, performing the functions of complete computer systems, communication gateways, smart phones, and imagers to name a few. The specific preselected functions will be controlled by the selection of components and programming of the SiP. In some embodiments, the SiP 401 consists of a substrate, a PMIC 402, a microprocessor 406, memory 403, and other active (and passive) components 404, 405 all suitable for use in a system for performing preselected functions. In certain aspects, the SiP may include a substrate that has operative interconnections on or in the substrate between the PMIC, microprocessor, memory and other components, as depicted by the various connections between these components in FIG. 4. As depicted in the example of FIG. 4, all of the components are operating on and supplied with three different voltages V1, V2, and V3 which are generated by the three power generating sections 411, 412, and 413 of the PMIC. Although only three voltages are depicted in FIG. 4 for the PMIC, a PMIC may, depending on its design, provide more than or less than three supply or output voltages.

According to some embodiments, each of the power generating sections may be adjusted, again depending on the PMIC design, to provide multiple different voltages under the control of the PMIC control subsystem 410. The PMIC control section 410 may be used to configure and tune the voltages supplied by each of the three generating section as specified by control signals 422 provided by an external test controller 421. The control subsystem may be, for example, an Electrically Erasable Programmable Read-Only Memory (EE-PROM). The EE-PROM may include, for instance, one or more registers corresponding to the different output voltages. Additionally, and in certain aspects, the control sub-system may be externally controllable via one or more inputs of the PMIC 402 or the overall SiP 401, via external connectors.

According to some embodiments, the SiP package encapsulates the substrate, PMIC, microprocessor, and other components, but has a plurality of external connectors exposed from the packaging. A first plurality of these external connectors 423, 424, 425 and 426 may be for operation of the SiP, including the performance of its preselected functions. A second plurality of the external connectors may be for selected communications signaling 422 for the PMIC 402 and at least a microprocessor 406, and a third plurality of the external connectors may be employed for and suitable for providing the output voltages 431 that are normally supplied by the PMIC 402 to the SiP components, but this third plurality of the external connectors may also be employed to provide external power for the SiP components. By doing so, the signals may be connected externally during operation and selectively connected during configuring, tuning and/or troubleshooting. For instance, they may be connected to an external test controller 421 and/or an external power source for independently powering components of the SiP 401 without the PMIC 402. For instance, if the PMIC has been shut down or otherwise bypassed such that it is no longer powering devices of the SiP 401.

According to some embodiments, delivery of operating power from the PMIC 402 to the other components 403, 404, 405, 406 can be interrupted until the PMIC 402 is properly tuned and/or reprogrammed. This may prevent, for instance, destruction of one or more of components 403, 404, 405, 406 due to the delivery of an improper voltage. These operations may be managed, for instance, by an external logic verification and test controller 421 by switching on and off the three voltage sections 411, 412, 413 using the switches on the outputs of each section responsive to control signals 422 supplied to the PMIC control section 410. Further, the power outputs of the PMIC sections 411, 412, 413, which are V1, V2, and V3, may be interrupted until the PMIC voltage verification and tuning process is completed for each voltage generating section one at a time and then selectively turned back on with control signal 422. The timing by which voltages/components are turned back on may be controlled, for instance, by the configuration of the PMIC 402, including control subsystem 410. Depending on the system design, the appropriate procedure and tests may be developed and implemented to configure and tune the PMIC voltages. Partially powering SiP components with only one of several needed voltages may result in damage to a component, so some care is appropriate in determining how the sections are adjusted and tuned and then used to power up the SiP.

According so some embodiments and in the example of FIG. 4, signals 423, 424, 425 and 427 are shown and may be inputs and/or outputs from each of the four components and may be supplied to or received from 426 the external test controller 421. The switches for the three PMIC voltage generating sections 411, 412, 413 may all be open and the necessary voltages supplied to the other SiP components 403, 404, 405, 406 through lines contained in 431 for individual testing of each component, if needed. Alternatively, these same lines 431 may be used to monitor the actual voltages that are being supplied by the PMIC to these components, when the PMIC switches are all closed.

Additionally, each supply or voltage generating section may be tuned after each section 411, 412, or 413 is turned on (switches closed) and then tested by the external tester 421 to see if still set at the correct output voltage when loaded; if not, it may be "tuned" via control signals 422 and controller 410 to be reset to the desired correct value. In some embodiments, that voltage section may then be shut down (switch opened) and the next section loaded (switch closed) and tested, as needed. In some cases, the system will not function correctly if only one voltage from one generating section is being supplied to the other components, and the other voltages are "off."

Figure 5:
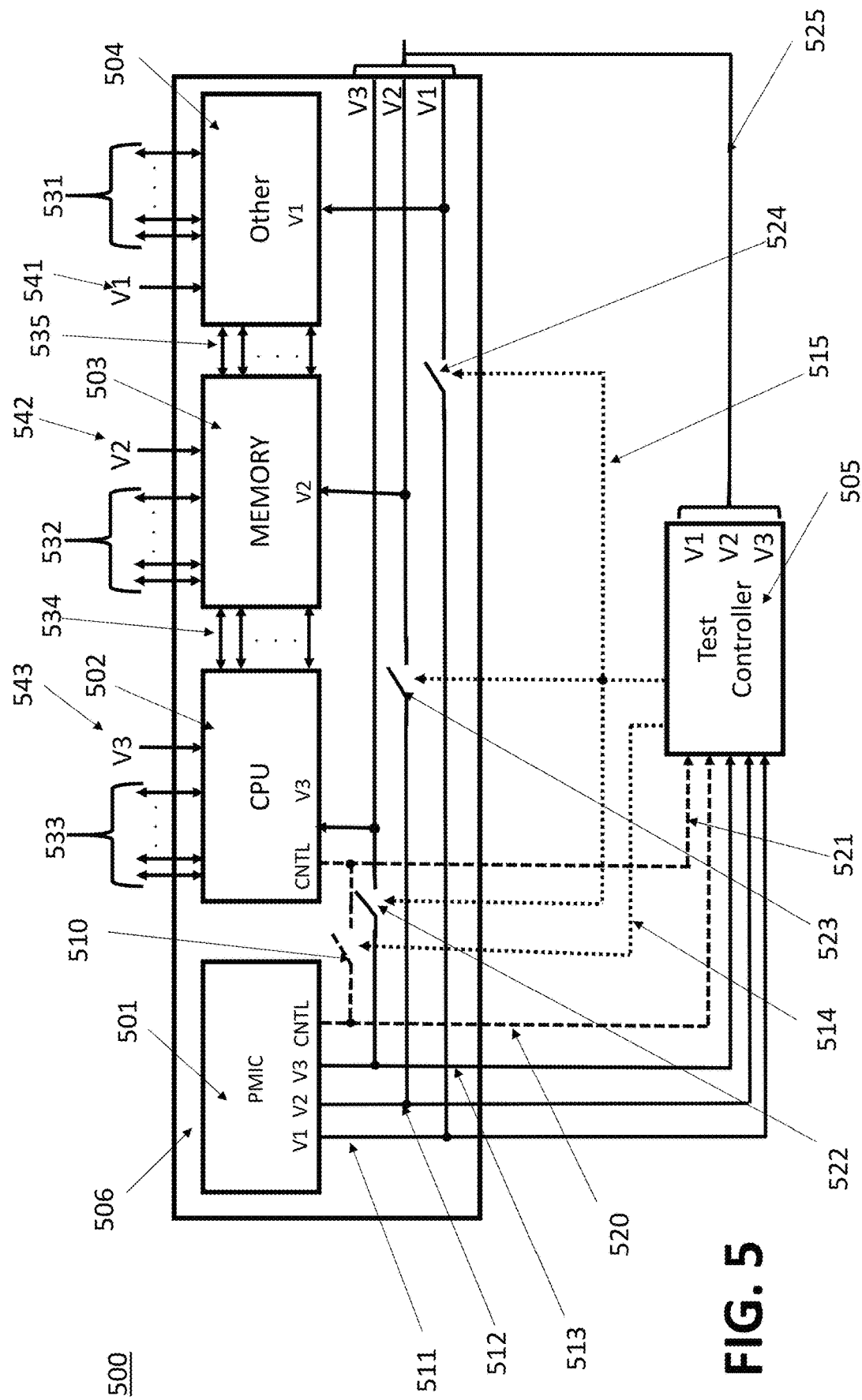
FIG. 5 a block diagram of a SiP design according to some embodiments.

FIG. 5 depicts an arrangement 500 for configuring a SiP 506 according to some embodiments. For instance, FIG. 5 illustrates the connections for some or all of the communications signals within a SiP, for example, as shown as group 111 in FIG. 1, to external contacts of the SiP 506. In certain aspects, the communications signals may be accessed externally and selectively controlled during configuring, tuning and/or troubleshooting operations. These operations may be managed, for example, by an external logic verification, programming and test controller 505 by switching on and off the voltages 511, 512, and 513, by controlling switches 522, 521 and 524 using control signals 515. Although only three voltages are depicted in FIG. 5 for the PMIC 501, a PMIC may, depending on its design, provide more than or less than three supply or output voltages.

In the example of FIG. 5, the power outputs 511, 512, 513 of the PMIC 501 may be interrupted until the PMIC set-up and verification process is completed, and then turned back on with an appropriate control signal 515 sent from the test controller 505 to the PMIC 501 and its switches. The switches 522, 523, 524 for each of the three voltages are depicted outside of the PMIC 501 in FIG. 5. Alternatively, these switches may be inside of and be part of the PMIC 501, as in the depiction of the PMIC in FIG. 4. In another alternative, all of these switches may be outside of the SiP and controlled by the test controller 505. For this case, the PMIC voltages are brought out of the PMIC for configuring, tuning and/or troubleshooting operations and then (externally to the SiP and using the SiP external connections, such as pins or a ball grid array) permanently connected to the voltage inputs 525 after these operations are completed. FIG. 5 also depicts the normal inputs and outputs 531, 532, 533 for the components 504, 503, 502 of the SiP 506. In addition, FIG. 5 depicts the interconnections 534 and 535 between the components of the SiP that are typically provided by the substrate on which the components are installed. Accordingly, FIG. 5 illustrates one embodiment of a SiP 506 whose design is for performing some preselected function(s), once programming and test controller 505 and its connections are removed. However, it should be noted that the test controller 505 may be replaced by an external power source and the switches 522, 523, 524 may be closed and power supplied to the components in the SiP from the PMIC and the external power source (via connections 525).

Figure 6:
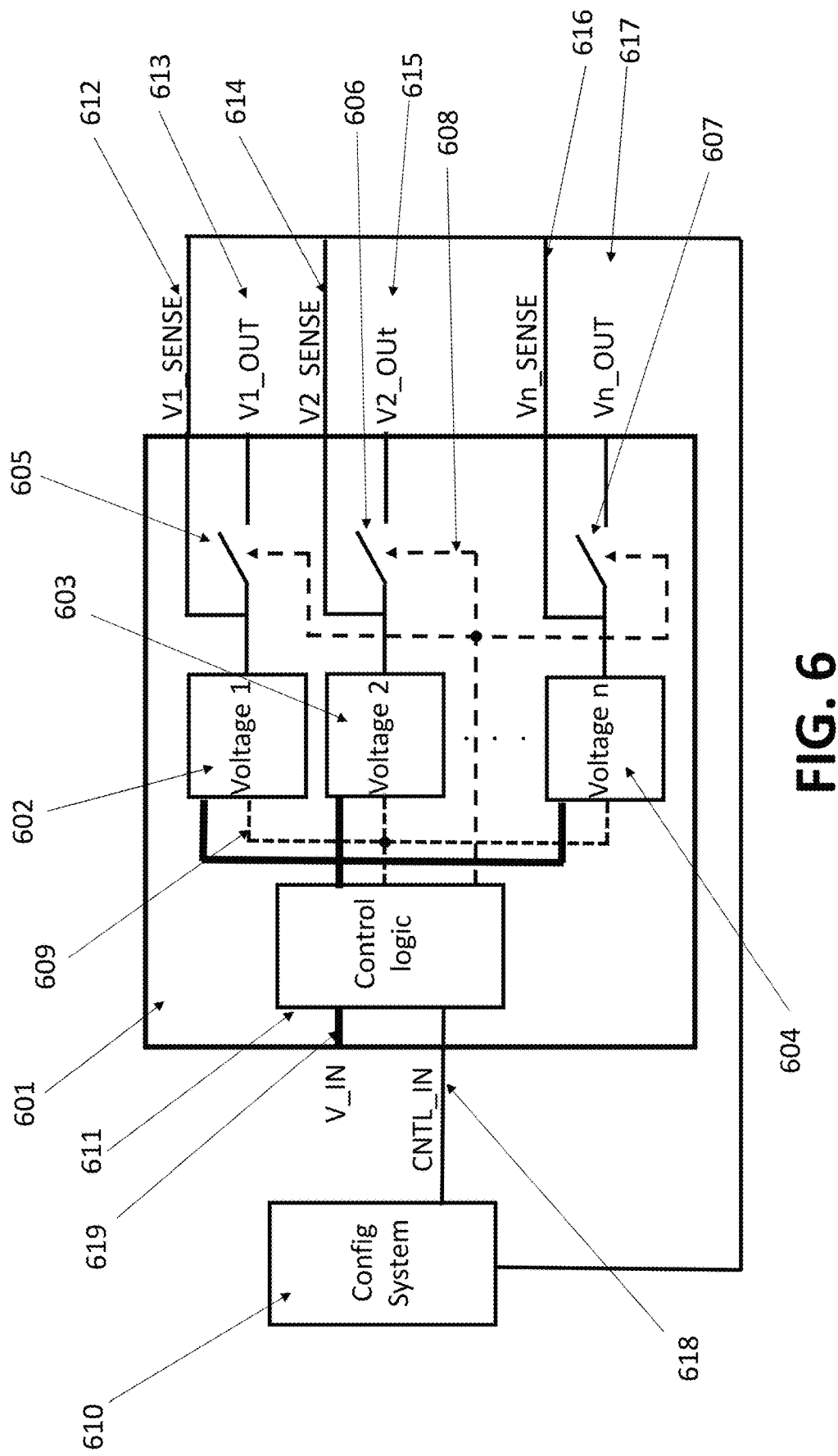
FIG. 6 depicts an arrangement for configuring and tuning a PMIC that is integrated in a SiP, according to some embodiments.

FIG. 6 depicts a block diagram of a PMIC 601 according to some embodiments. In certain aspects, this arrangement could allow the PMIC 601 to be configured and tuned after it is installed, connected, and fully encapsulated in a SiP device. In this example, the PMIC 601 has as its inputs V_IN 619 and various control signals 618 which are supplied to the PMIC control logic 611. In turn, each of the power generating sections 602, 603 and 604 of the PMIC are supplied with V_IN and control signals 609 by the control logic 611. In some embodiments, each power generating subsystem would have two outputs, for example, V1_SENSE 612 and V1_OUT 613 (other sense lines 614 and 616 are also depicted for the other power generating sections). During the configuring and tuning process, for instance as described with respect to FIGS. 3-5, and prior to powering up the rest of the system, the control logic 611 could be used by an external configuration, programming and test controller 610. In some embodiments, the external controller 610 instructs the internal control logic 611 to open the V1_OUT switch 605 (other output switches 606 and 607 are also depicted), and configures and tunes the outputs of the PMIC 601 using the sense signal lines 612, 614 and 616 as inputs to the external configuration system 610. Once all of the power supplies in the PMIC 601 are configured to the proper desired voltages, the output switches 605, 606 and 607 are turned on to power up the remainder of the SiP. Programming and tuning of the voltage output values may either be done prior to or after the switches are turned on depending on the loading of each section providing a supply voltage V1, V2, V3. In some cases it may be determined to turn on one output voltage at a time. In embodiments, the external controller 610 itself determines how the configuration, programming and tuning process would be handled.

In some embodiments, the sense outputs 612, 614 and 616, would not be necessary. For instance, if the PMIC was provided to the system assembler or manufacturer in packaged form, they would not have to be pinned out in the packaged version of the PMIC and SiP device, thus saving SiP packaging cost by eliminating pins. However, they would be available in die form for the SiP assembler or manufacturer to connect to the control and sense pins for use to configure and trim the PMIC after it has been assembled into the SiP.

Figure 7A:
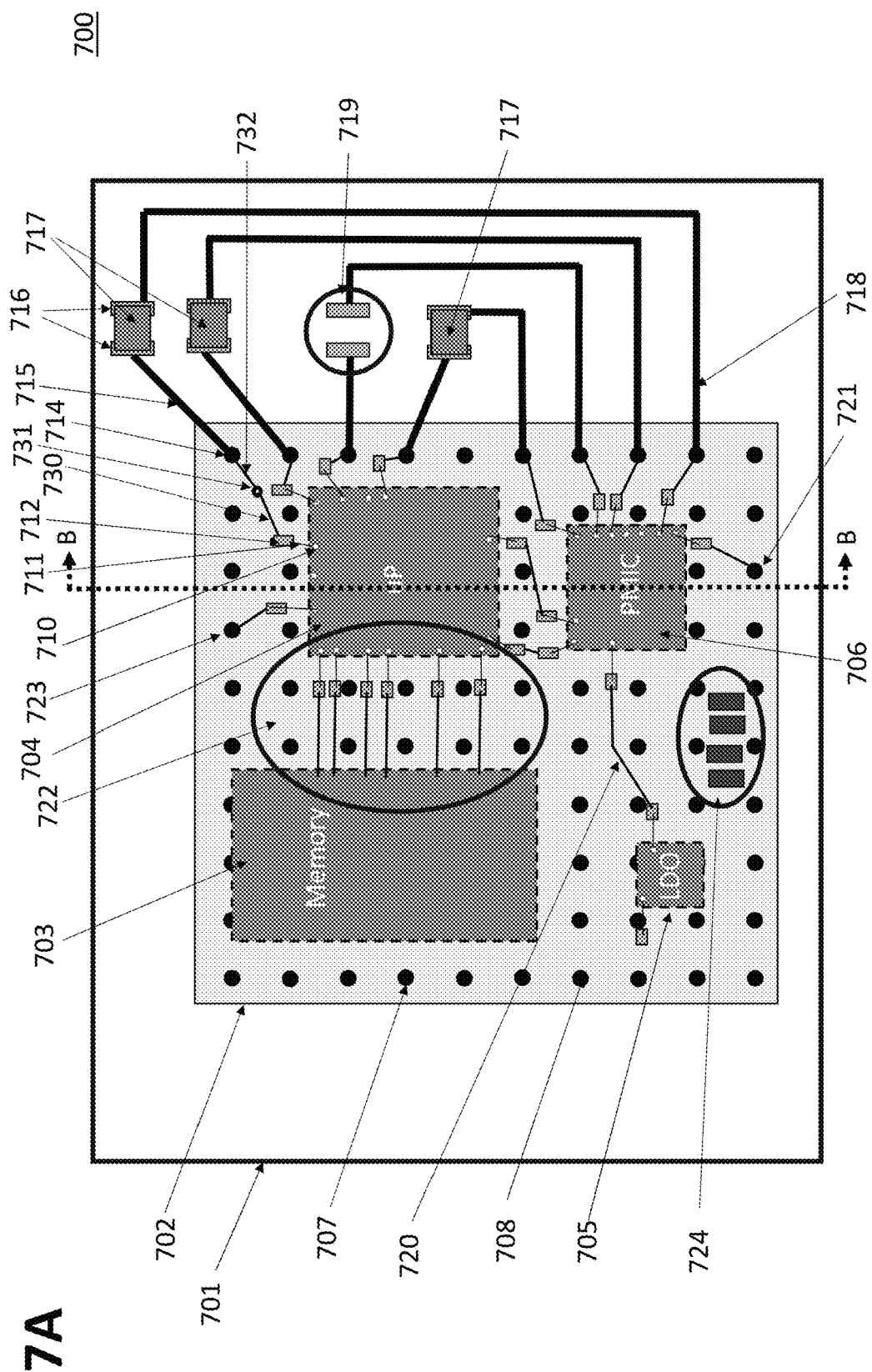
FIGS. 7A-7C depict a system in accordance with some embodiments.

FIG. 7A depicts a system 700 in accordance with some embodiments. In this example, the system includes a Printed Circuit Board (PCB) 701 with a SiP device 702 and resistors 717. Inside the packaged SiP 702 are additional components 703, 704, 705 and 706, which may be active components, along with passive devices (e.g., 724). In some embodiments, the SiP 702 is the only active component attached to the PCB. The ball (pin) locations for the SiP are depicted as small black dots (like 708) when viewed from the top looking through the SiP package.

In this example, inside the SiP are at least four components, including: a Power Management Integrated Circuit (PMIC) 706, a microprocessor (uP) 704, a Low Drop Out (LDO) power supply 705, and a memory device 703. The PMIC 706 and uP 704 may correspond, in some instances, to the PMIC and uP/uC discussed in regard to FIGS. 3-6. Also included in the SiP of the FIG. 7 example are several passive devise 724 and external connectors. The external connectors (black dots 707,714) may be a connection ball grid array on the back side of the SiP exemplified by 707, 714, 721. According to some embodiments, the connection balls may be replaced by connection pins or similar output wires.

With further reference to FIG. 7A, examples of the various connections between the active devices in the SiP 702 and with the connection balls for external use are: Internal connections among components in the SiP 720 and 722; signals connected to the connection balls from various components 723 for use outside of the SiP; power inputs and outputs from the PMIC 706 and LDO 705 to the connection balls 708 and 721; and 4 communications signals between the uP 704 and the PMIC 706, which have been brought out to the PCB through connection 715 and through connection 718, as an example. According to some embodiments, external components, such as external testing/controlling elements discussed in connection with FIGS. 3-6, can contact the internal components of the SiP 702 through contact 719. For instance, the external connects (e.g., 707, 714, 721) can provide access to the internal components for programming and/or monitoring. Programming or otherwise configuring may include reprogramming and/or configuring. This may include, for example, updating or completing a set of programming or configuring performed by a manufacturer.

In the example of FIG. 7A, the communications signals, such as signals 722, between the uP 704 and the PMIC 706 are brought to the outside of the SiP, through the external connectors, to have them available for, but not limited to, connecting external power sources needed to manage the power requirements of the SiP, troubleshooting a problem, and for external control if desired or for configuring and tuning the PMIC 706 after it has been integrated into the SiP 702. For simplicity, only one of the communications signals will be described as follows. The electrical path for the example signal starts at the uP die 704 where a bond wire 711 connects the uP's bond pad 710 to the landing pad on the SiP substrate 712. From the landing pad 712 a signal trace on the substrate top surface 730 connects to a via 731 which connects to a signal trace on the bottom layer 732 which finally connects to a ball 714. From the connection ball 714 a signal trace 715 on the PCB 701 is connected to one of the landing pads 716 by way of a PCB signal trace 715. In this example, a zero ohm resistor 717 or a jumper (not shown) may be electrically attached. The other landing pad 716 is then connected to PMIC 706 through a trace on the PCB to a connection ball to a trace 718 on the substrate of the SiP to the PMIC. In some instances, one or more zero ohm jumpers may be left off (e.g., 719) making it available to be connected to another external device or tester.

Figure 7C:
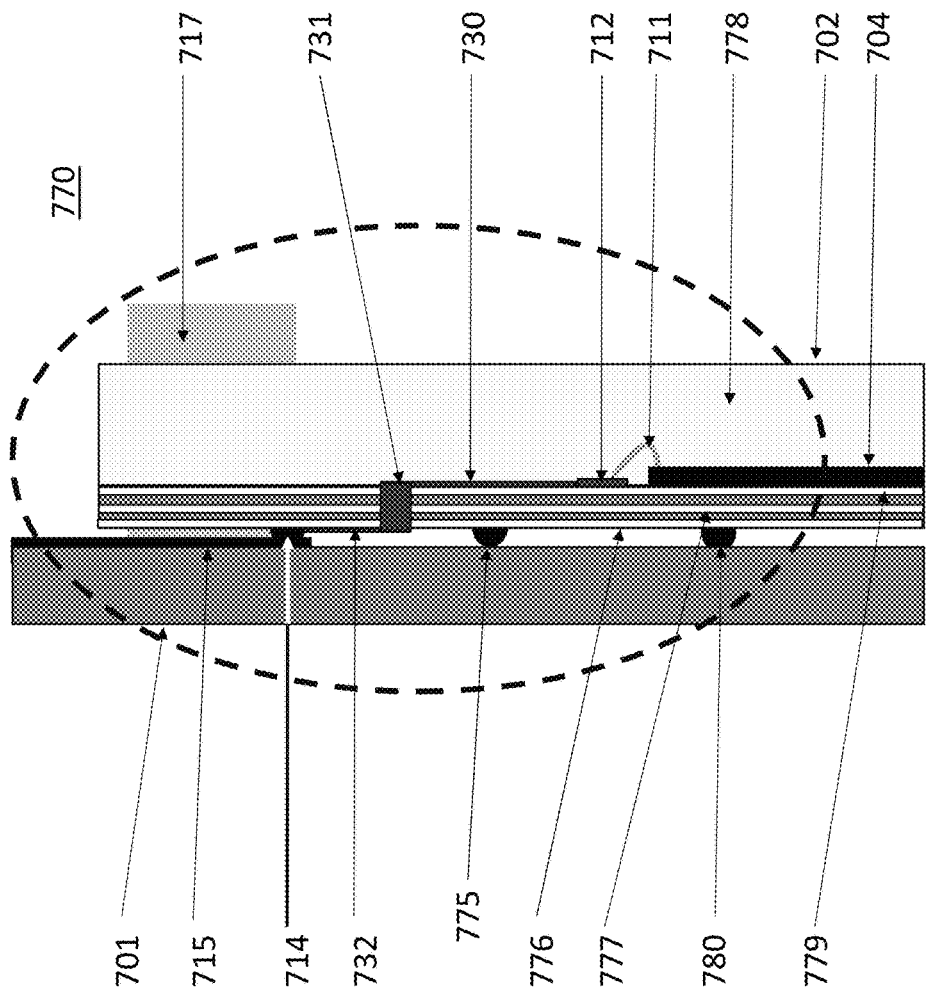
Figure 7B:
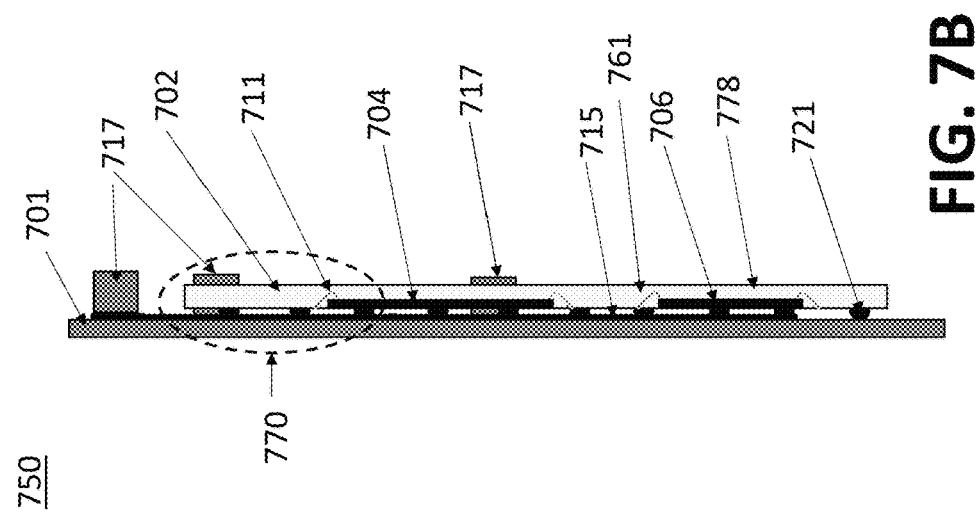

FIG. 7B depicts a cross-section 750 of the system 700 along line "B." This cross-section shows the PCB 701, the SiP 702 and the three zero ohm resistors 717 shown in FIG. 7A. Internal to the SiP are shown the uP 704 and the PMIC 706 electrically connected to the substrate of the SiP using bond wires 761. The SiP 702 is electrically attached to the PCB 701 by the connection balls 721 where they are connected to the appropriate components on the PCB 701 by signal traces 715. In this example, the zero ohm resistors 717 are connected using the signal traces on the PCB 715.

FIG. 7C depicts another view of section 770 of FIG. 7B with additional details of the items inside of the SiP 702. From left to right, is the PCB 701, a signal trace 715 on the PCB, three of the SiP's connection balls (e.g., 714), the zero ohm resistor 717 and SiP 702. The SiP consists of a substrate with three layers 776, 777, and 779, traces such as 715 and 730, vias such as 731, landing pads such as 712, wire bonds such as 711, active devices such as 704, all encapsulated within the packaging of the SiP device. The SiP is encapsulated in a package 778 (only a portion of the package is depicted in FIG. 7C).

With respect to FIG. 7C and the example communication signal and electrical path described with respect to FIG. 7A, the uP die 704 is connected to a signal trace 730 on the top surface of the substrate 779 with a bond wire 711 from the uP to a landing pad 712. The top surface trace 730 then connects the landing pad 712 to a via 731. The via connects the trace 712 to a trace 732 on the bottom surface of the substrate 776 which connects to the connection ball 714. Finally the connection ball is attached to the trace 715 on the top surface of the PCB 701.

In FIG. 7, the external connections of the SiP are provided by one more physical connections exposed from the packaging, such as a ball grid array. However, according to some embodiments, external connection to the components may also be provided by a wireless subsystem within the SiP. This may be in addition to, or in place of, the physical connections discussed with regard to the preceding figures. A SiP may include a wireless subsystem having, for example, one or more of an antennae, transmitter, receiver, and transceiver for communicating with devices external to the SiP. For example, the wireless subsystem may communicate internal signaling of the SiP to an external test controller. Similarly, the wireless subsystem may receive reprogramming information for one or more component of the SiP, such as a PMIC. The control of the wireless subsystem may be embedded in such system and/or performed by one or more of a uC (e.g., CPU 406) or code stored in a memory of the SiP (e.g., memory 403). According to some embodiments, use of the wireless subsystem would allow for the SiP to be completely encapsulated during packaging, without any exposed physical connections. This may be beneficial in certain applications, including smart sensors (smart dust), remote sensors which need to be self-powered while wirelessly communicating with the rest of the system of which they are part. Some specific examples may include devices that cannot be readily accessed but must be monitored and/or configured, such as those in an airframe of an airplane or electronics implanted in a human or animal body.

Figure 8:
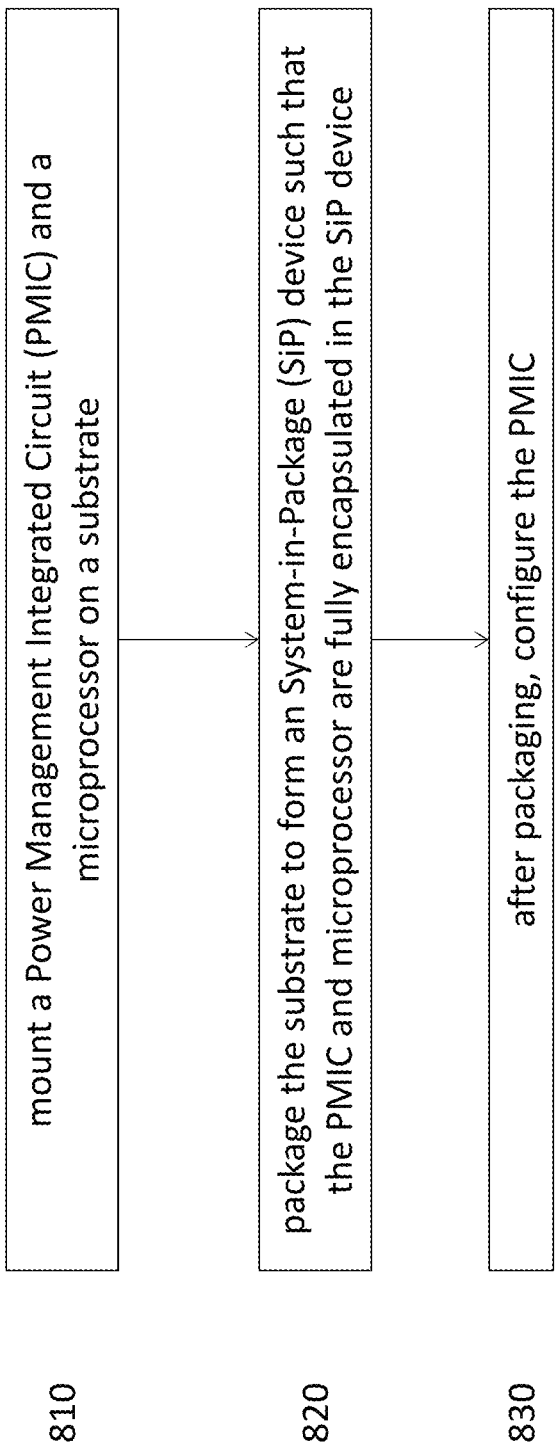
FIG. 8 depicts a process for configuring a packaged power management device according to some embodiments.

Referring now to FIG. 8, a process 800 for configuring a power management device, such as a PMIC in accordance with some embodiments, is provided. The process may include, for instance, use of one or more of the devices and systems described with respect to FIGS. 3-7. The process may begin with step 810, in which the PMIC is mounted, along with at least a microprocessor (and other components), to a substrate. In step 820, the substrate is packaged to form a SiP device, such that the both the PMIC and the microprocessor are fully encapsulated in the SiP device. According to some embodiments, one or more external connectors of the SiP remain exposed from the packaging following step 820. In step 830, after packaging step 820, the PMIC is configured.

According to some embodiments, the configuring of step 830 can include communicating with the PMIC through the external contacts in electrical contact with the PMIC to reprogram the PMIC. Alternatively, the PMIC could be contacted and reprogrammed via a wireless subsystem of the SiP. The reprogramming may be performed, for instance, by a test controller, such as device 421, 505, or 610. In some aspects, the reprogramming may include modifying a register value of the PMIC. The register value may correspondence to and/or define an operational output voltage of the PMIC for a particular component of the SiP. In some embodiments, reprogramming includes opening one or more switches of the SiP to interrupt delivery of an output voltage from the PMIC to at least one component the SiP. That is, in some embodiments, reprogramming can be performed while one or more power outputs of the PMIC is interrupted. This may further include, for example, measuring a sense value of the PMIC, verifying the measured sense value, and then closing a switch of the SiP to re-establish a power output based on said verifying. This could protect elements of the SiP against the delivery of an improper, destructive power level. Similarly, elements may be protected by establishing at least one timing parameter for sequential-power up, which is controlled by the PMIC. As with other aspects, these timing parameter may be programmed via external communication.

In some embodiments, configuring of the PMIC at step 830 can include: mounting the SiP device on a test structure; actuating one or more switches of the test structure; measuring a sense value of the PMIC; and modifying at least one setting of the PMIC based on the sense value. The test structure may be, for example, a Printed Circuit Board (PCB).

Figure 9:
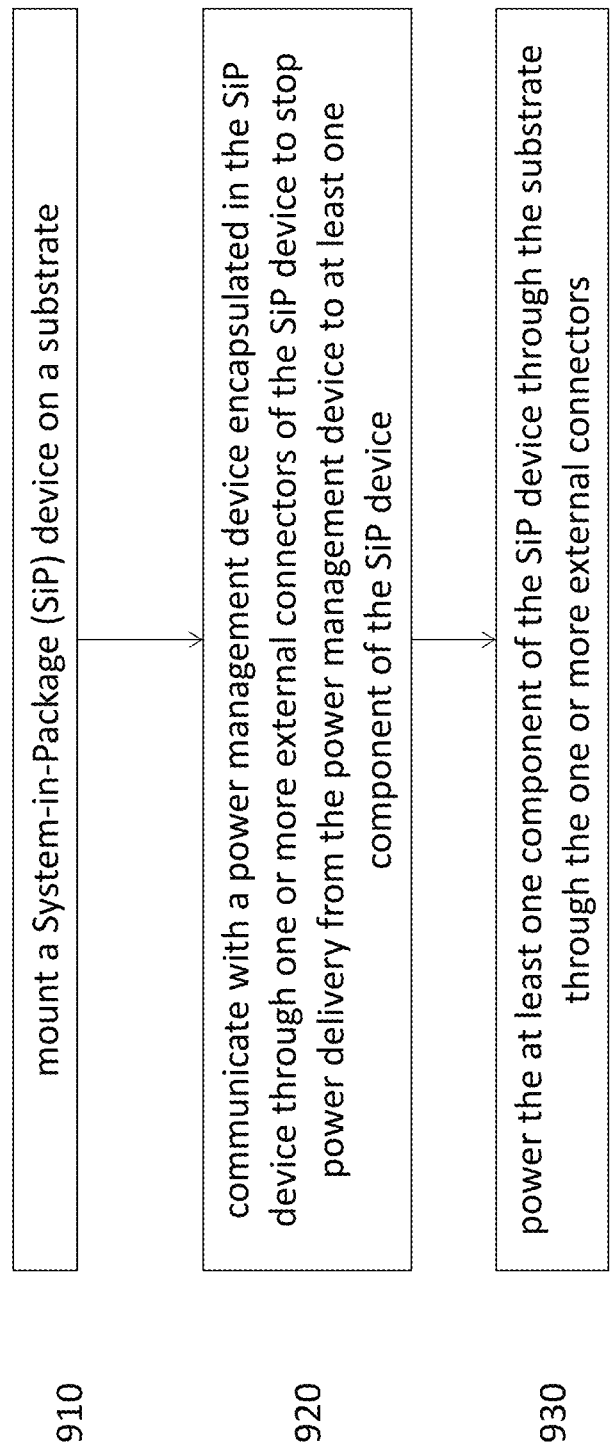
FIG. 9 depicts a process for powering a SiP device according to some embodiments.

Referring now to FIG. 9 a process 900 for powering a SiP device is provided. The process may include, for instance, use of one or more of the devices and systems described with respect to FIGS. 3-7. The process may also include one or more steps of process 800, set forth with respect to FIG. 8. According to some embodiments, process 900 may begin with step 910, in which a packaged SiP device is mounted onto a substrate, such as a PCB. In step 920, a power management device encapsulated in the SiP device, such as a PMIC, is contacted through one or more external connectors of the SiP device. This may include, for instance, control signaling to stop power delivery from the power management device to one or more other components of the SiP. Then, in step 930, these components can be powered through the substrate and external connectors. Thus, in some embodiments, power delivery of the PMIC can be supplemented or replaced with power delivery through the substrate from some external power supply.

Figure 10A:
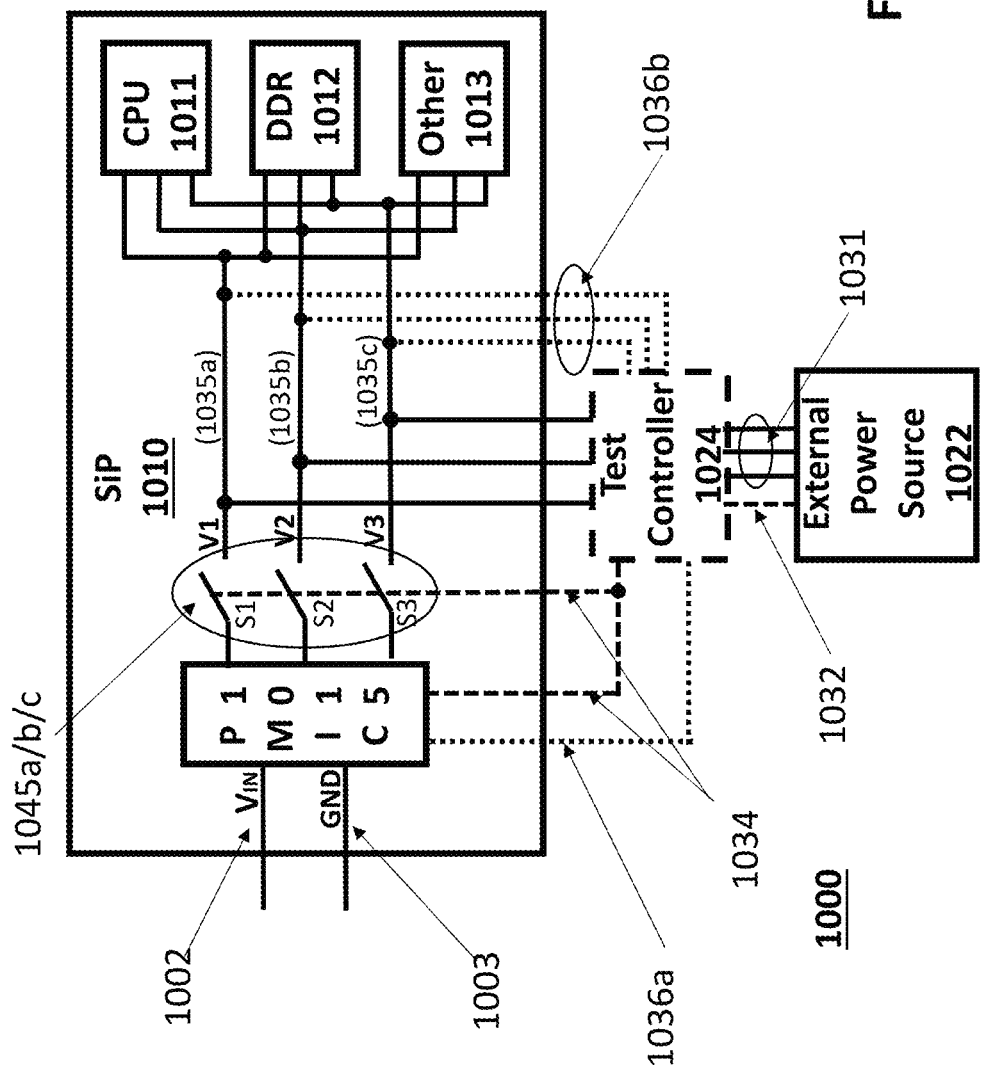
FIGS. 10A and 10B depict a SiP device and power source according to some embodiments.

Referring now to FIG. 10A, a system 1000 is provided according to some embodiments. FIG. 10A can illustrate aspects of the systems depicted in FIGS. 4 and 5 in some embodiments. In this example, a System in Package device (SiP) 1010 is provided with an External Power Source (EPS) 1022 electrically connected to the SiP device 1010 through the External Test Controller (ETC) for the purpose of augmenting the power generated by the SiP's internal Power Management Integrated Circuit (PMIC) 1015. In embodiments, the PMIC 1015 is powered using VIN 1002 and GND 1003, and the PMIC outputs 1035a/b/c are connected to three components 1011, 1012, 1013 of the SiP. An EPS 1022 and an External Test Controller (ETC) 1024 are also depicted as well. According to embodiments, the ETC 1024 has control signals 1032 and 1034 to control the output power lines 1031 of the EPS 1022, along with the output power from the SiP's PMIC 1015, respectively, while sensing 1036a/b the SiP's internal voltage rails 1035a/b/c (V1, V2 and V3 respectively) in the PMIC 1015 outputs and at the power sinks 1011, 1012, and 1013, respectively. In this example there are three components being powered in the SiP 1010: a microprocessor (uP) 1011, a DDR 1012, and a third plurality of passive and active components referred to as "other" components 1013 in this figure. Embodiments may use different components.

By controlling both the power outputs of the internal PMIC 1015 and the EPS 1022, when the switches 1045a/b/c (S1, S2, S3) are closed, the power supplied to the SiP components 1011, 1012, 1013 can be from a combination of the PMIC 1015 and the EPS 1022. The power sources for the SiP may be: (1) from the PMIC 1015 only, (2) from the EPS only, (3) selectively from either the PMIC or EPS, or (4) selectively from both the PMIC and EPS. This allows the SiP 1010 to function in a lower power mode using only the power from the internal PMCI 1015, and in a high-performance mode by combining the power of the internal PMIC 1015 and the power of the EPS 1022. Also, the external test controller may for some embodiments be an external controller for monitoring and controlling power from a given power source. A PMIC typically contains a built-in controller for its output power subsystems to avoid excessive power or current and possible destruction of the PMIC and any associated components powered by it.

Although in this example 1000 two power sources are depicted (an internal PMIC 1015 and an EPS 1022), more than two power sources (EPSs and PMICs) may be included in the system with one or more ETCs and one or more SiPs each with one or more PMICs.

Focusing now on the various sensors 1036a/b, the sensing mechanism may be, for example, but not limited to a voltage sensor, current sensor, optical sensor, heat sensor or performance sensor.

In one embodiment, the External Power Source (EPS) may be as depicted in FIG. 10A where both the EPS 1022 and the ETC 1024 are a single unit. In another embodiment, the EPS 1022 may be the system power source for a larger system while the ETC 1024 is exclusively associated with the SiP device 1010. In a third embodiment the ETC may function like an LDO to convert the voltage from the EPS 1022 to the necessary voltage to power the SiP components 1011 1012 1013.

Figure 10B:
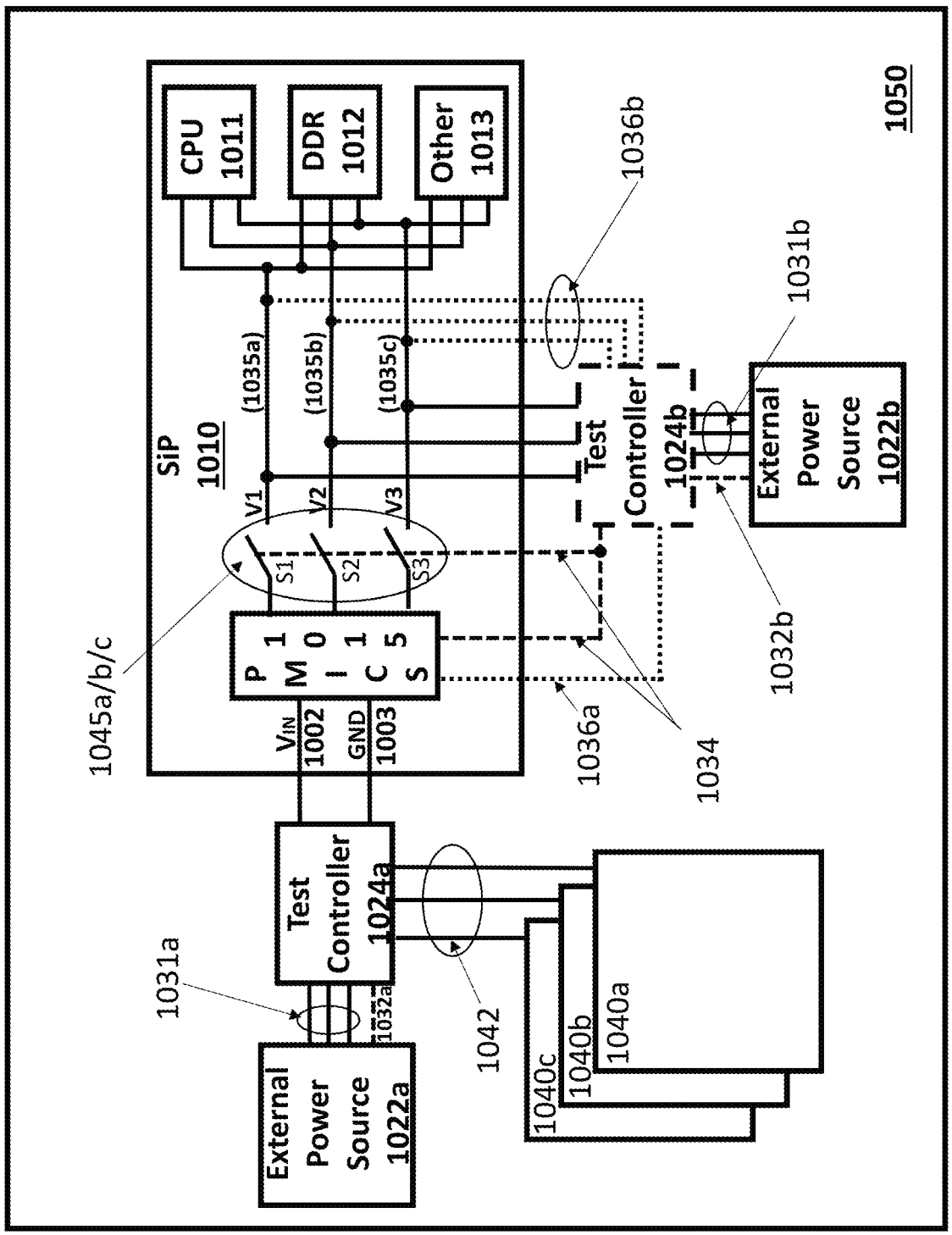

FIG. 10B depicts a system 1050 according embodiments, which comprise a System in Package (SiP) device 1010, multiple other components 1040a/b/c, two external test controllers (ETC) 1024a/b and two external power sources (EPSs) 1022a/b. The SiP device 1010 in this example comprises one or more power management devices 1015 which power multiple active components 1011, 1012, and 1013. The other active devices 1040a/b/c along with the PMICs 1015 are powered by one of the external power sources (EPS) 1022a in the system. Finally, a second EPS 1022b and ETC 1024b provide power to the SiP 1010 during high performance operations. The power to the SiP internal components 1011, 1012 and 1013 can either be from the PMICs 1015 or EPS 1022b, or a combined sum of both the PMICs 1015 and EPS 1022b under the control of the ETC 1024b.

In one embodiment, the external test controller (ETC) 1024b selectively switches off voltage outputs from the PMICs 1015 using switches 1045a/b/c and to replace the switched off outputs with outputs from the EPS 1022b. The sense lines 1036a/b are monitored by the ETC to assure that the power to the components 1011, 1012, 1023 in the SiP 1010 are managed appropriately.

In some embodiments, the ETC 1024b monitors the sense lines 1036a/b to manage the sum of the two power sources, 1015 and 1022b, to assure the needed power to optimize the performance of the components 1011, 1012, 1013 in the SiP 1010.

In some embodiments, the ETC 1024b may be integrated into the SiP 1010.

In some embodiments, the two power sources 1022a/b may be the same power source.

In some embodiments, the two ETCs 1024a/b may be combined.

FIG. 11 depicts a process 1100 of controlling the power requirements of a SiP device 1010 by augmenting the available internal power from the SiP PMIC 1015 using an external power source (EPS) 1022 controlled by an External Controller (EC) 1024. The SiP is initially powered 1102 by its internal Power Management Integrated IC (PMIC) 1015 and monitored by the external controller 1103. These two steps 1102 and 1103 can be considered the SiP's operations 1101. When the External Controller (EC) determines from the sense lines 1036a/b that the SiP requires additional power 1104 it begins to manage the External Power Source (EPS) 1105 to provide adequate power to the SiP by mixing the power from the internal PMIC 1015 and from the external power source 1022. Once engaged, the EC continues to manage the PMIC and EPS. This second process 1106 is the enhanced power management process (EPMP).

Some figures illustrate processes in accordance with certain embodiments. These processes may be performed using one or more of the foregoing devices, systems, and or flows. According to some embodiments, the disclosed devices, systems, and processes may be implemented using a non-transitory computer readable medium storing computer code for processing a set analog and digital input signals, the computer code being executable by a processor, such as a mixed signal processor, to cause the processor to perform one or more of the foregoing. In some aspects, a memory and processor are provided, where the memory includes instructions executable by the processor to perform one or more of the foregoing.

Further Examples

A1. A System-in-Package (SiP) device, comprising: a substrate; a power management device; a microprocessor; one or more additional components, wherein said additional components and said microprocessor are arranged such that the SiP device performs one or more preselected functions; a plurality of external connectors; and a package encapsulating said power management device, said microprocessor, and said additional components. The external connectors are at least partially exposed from said package, wherein a first plurality of said external connectors are for providing and/or receiving signals corresponding to said one more preselected functions during normal operation of the SiP device, wherein a second plurality of said external connectors are for providing and/or receiving communications signaling for one or more of said power management device and said microprocessor, and wherein a third plurality of said external connectors, in response to communications to said power management device, selectively provides the power generated by said power management device for use by said microprocessor and said additional components or provides power from an external power source/supply for use by said microprocessor and said additional components in combination/addition to the power from said power management device.

A2. The SiP device of A1, wherein said power management device is a Power Management Integrated Circuit (PMIC).

A3. The SiP device of A1, wherein said microprocessor is a microcontroller or microcomputer.

A4. The SiP device of A1, wherein the plurality of external connectors are pin connectors or a ball grid array.

A5. The SiP device of A1, where in the substrate comprises operative interconnections between said power management device, said microprocessor, and at least one of said additional components.

A6. The SiP device of A1, wherein said additional components comprise both active and passive components.

A7. The SiP device of A1, wherein said additional components comprise one or more of a Low Drop Out (LDO) power supply, memory, and wireless communication subsystem.

A8. The SiP device of A1, wherein a third plurality of said external connectors are for providing and/or receiving at least one of an input voltage and an output voltage of said power management device.

A9. The SiP device of A2, wherein said plurality of external connectors is arranged such that said PMIC can be reconfigured by an external device.

A10. The SiP device of A2, wherein said PMIC comprises one or more sense line outputs for monitoring an operational voltage of said SiP device, wherein said sense lines are directly connected to one or more of said plurality of external connectors.

A11. The SiP device of A1, further comprising one or more externally controllable switches.

A12. The SiP device of A11, wherein at least one of said one or more externally controllable switches is arranged to interrupt an output voltage of said power management device, switch an output of the SiP device to control signaling, or enable a read-out of voltage levels within the SiP device.

A13. The SiP device of A1, wherein said communications signaling comprises one or more of control signaling, handshake signaling, and data signaling.

B1. A Power Management Integrated Circuit (PMIC), comprising: at least one programmable power generating subsystem configured to output a plurality of signals, wherein a first of said plurality of signals has a first value for powering one or more components of a device, and a second of said plurality of signals has a second value, wherein said first value is an operational value and said second value is a monitoring value indicative of said first value; and a control logic subsystem for setting said first value.

B2. The PMIC of B1, wherein said first and second values are the same.

B3. The PMIC of B1, wherein said control logic subsystem is configured to modify said first value based on said second value.

B4. The PMIC of B1, wherein said control logic subsystem comprises an Electrically Erasable Programmable Read-Only Memory (EE-PROM).

B5. The PMIC of B4, wherein said power generating subsystem is configured to read one or more registers of said EE-PROM to modify said first value.

B6. The PMIC of B1, wherein said control logic subsystem is externally controllable via one or more inputs of the PMIC.

B7. The PMIC of B1, further comprising a plurality of externally controllable switches.

B8. The PMIC of B7, wherein said plurality of switches is arranged to selectively prevent output of the first of said plurality of signals and enable output of the second of said plurality of signals.

C1. A System-in-Package (SiP) device, comprising: a PMIC having selected control and communication signals available as outputs from the SiP for inputs back into other components of the SiP and for controlling whether the power generating sections of said PMIC are available for providing power to one or more of: to said SiP other components, only available for controlling and establishing the desired voltages for each of said power generating sections and for providing supplemental external power to said SiP other components.

D1. A method for configuring power management of a device, comprising: mounting a Power Management Integrated Circuit (PMIC), a microprocessor and other active and passive components on a substrate having at least operative interconnections between the PMIC and microprocessor, and other components; packaging said substrate to form a System-in-Package (SiP) device such that said PMIC and said microprocessor are fully encapsulated in said SiP device; and after said packaging, configuring said PMIC.

D2. The method of D1, wherein configuring said PMIC comprises: contacting said PMIC through an external contact of said SiP device in electrical contact with said PMIC; and reprogramming said PMIC.

D3. The method of D2, wherein said reprogramming is performed by a test controller and further comprises modifying a register value of said PMIC.

D4. The method of claim D2, wherein said reprogramming comprises opening one or more switches of said SiP to interrupt delivery of an output voltage from said PMIC to at least one component of said SiP.

D5. The method of D1, wherein said configuring said PMIC comprises reprogramming said PMIC via a wireless connection.

D6. The method of D1, wherein said configuring said PMIC comprises: mounting said SiP device on a test structure; actuating one or more switches of said test structure; measuring a sense value of said PMIC; and modifying at least one setting of said PMIC based on said sense value.

D7. The method of D6, wherein said test structure is a Printed Circuit Board (PCB).

D8. The method of D4, further comprising: closing at least one of switch of said SiP and measuring a loaded voltage of said PMIC.

D9. The method of D2, wherein said reprogramming is performed while at least one power output of said PMIC is interrupted, further comprising measuring a sense value of said PMIC; verifying said measured sense value; and closing a switch of said SiP to re-establish a power output based on said verifying.

D10. The method of D1, wherein said configuring comprises establishing an output voltage for said PMIC.

D11. The method of claim D1, wherein said configuring comprises establishing at least one timing parameter for sequential-power up of a plurality of components controlled by said PMIC.

D12. The method of D11, wherein said timing parameter is programmed via external communication.

E1. A method for powering a System-in-Package (SiP) device, comprising: mounting the SiP device on a substrate; contacting a power management device encapsulated in the SiP device through one or more external connectors of the SiP device to deliver power from said power management device to at least one component of the SiP device; and also powering of at least one component of the SiP device by the substrate through the one or more external connectors.

E2. The method of E1, wherein said substrate is a Printed Circuit Board (PCB) and said power management device is a Power Management Integrated Circuit (PMIC).

F1. A SiP, comprising: an internal power management device; internal components; and having a plurality of external connectors, wherein the internal power management device of the SiP is configurable using a first set of external connectors, wherein a power supply provides power to the internal power management device of the SiP using a second set of external connectors, and wherein the power supply provides power to internal components of the SiP using a third set of external connectors G1. A method comprising: externally monitoring power for internal components; determining if additional power is needed; and, if so, suppling additional power from an external power source.

While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A system, comprising:
a System-in-Package (SiP) device having an internal power management device, one or more internal components, and a plurality of external connectors; and
at least one external power supply for powering the system,
wherein the internal power management device of the SiP is configurable using a first set of the external connectors,
wherein the at least one external power supply provides power to the internal power management device of the SiP using a second set of the external connectors,
wherein the at least one external power supply provides power to one or more of the internal components of the SiP using a third set of external connectors, and
wherein the system is configured such that:
the at least external power supply does not provide power to internal components of the SiP using the third set of external connectors during a low power mode of operation of the system, and
the at least external power supply provides power to the internal components of the SiP using the third set of external connectors during a high performance mode of operation of the system.

2. The system of claim 1, wherein a single external power supply is configured to provide power to at least one internal component of the SiP and to the power management device of the SiP.

3. The system of claim 1, wherein the power management device is a power management integrated circuit (PMIC).

4. The system of claim 1, further comprising:
a substrate on which the SiP is operatively mounted,
wherein the second and third sets of external connectors provide power to the SiP through the substrate.

5. The system of claim 1, further comprising:
a controller,
wherein the controller is a standalone controller, part of one or more of the external power supplies, internal to the SiP, or a part of the power management device.

6. The system of claim 5,
wherein SiP comprises one or more sense lines connected to the controller to provide information regarding one or more power needs of the SiP or components thereof, and
wherein the controller is configured to control power delivery to the internal components based on the sensed power needs.

* * * * *